(12) United States Patent
Ishitsuka et al.

(10) Patent No.: US 8,629,931 B2
(45) Date of Patent: Jan. 14, 2014

(54) IMAGING APPARATUS AND IMAGING METHOD THEREOF

(75) Inventors: Yuichiro Ishitsuka, Yokohama (JP); Taeko Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 12/850,512

(22) Filed: Aug. 4, 2010

(65) Prior Publication Data

US 2011/0050972 A1 Mar. 3, 2011

(30) Foreign Application Priority Data

Aug. 28, 2009 (JP) .................................. 2009-198354

(51) Int. Cl.
*H04N 5/232* (2006.01)

(52) U.S. Cl.
USPC .................. 348/345; 348/333.01; 348/221.1; 348/362

(58) Field of Classification Search
USPC ................ 348/207.99–376; 396/354
See application file for complete search history.

(56) References Cited

U.S. PATENT DOCUMENTS

| | | | | |
|---|---|---|---|---|
| 6,453,124 B2* | 9/2002 | Morimoto et al. | ............... | 396/91 |
| 2005/0117049 A1* | 6/2005 | Suzuki | ........................ | 348/345 |
| 2007/0292123 A1* | 12/2007 | Ueda et al. | .................... | 396/374 |
| 2008/0068490 A1* | 3/2008 | Ueda et al. | .................... | 348/341 |
| 2009/0135295 A1* | 5/2009 | Kunishige et al. | ............ | 348/362 |

FOREIGN PATENT DOCUMENTS

JP 2007-184912 A 7/2007

* cited by examiner

*Primary Examiner* — Roberto Velez
*Assistant Examiner* — Yih-Sien Kao
(74) *Attorney, Agent, or Firm* — Canon USA, Inc., IP Division

(57) ABSTRACT

An imaging apparatus, when an image captured by an imaging unit thereof is not displayed on a display unit, can facilitate framing of an object to be imaged. An aspect ratio setting unit sets an aspect ratio imaged by an image sensor. A system control circuit controls, in a first mode, the display unit to display image data captured by an image sensor in the aspect ratio, and in a second mode, not to display the image data. The system control circuit also displays, in the second mode, information from which at least one of a focus detectable position and a metering area within a shooting area in the aspect ratio is identifiable.

17 Claims, 15 Drawing Sheets

IMAGING APPARATUS AND IMAGING METHOD THEREOF

BACKGROUND OF THE INVENTION

1. Field of the Invention

The present invention relates to an imaging apparatus for facilitating framing of an image captured by an imaging unit and an imaging method thereof.

2. Description of the Related Art

Among digital single-lens reflex cameras, a camera having a mode in which a movable mirror is moved down to cause an optical finder to display an object image and a live view mode in which the movable mirror is moved up to cause a display unit to display an image captured by an image sensor in real time has been conventionally known.

Japanese Patent Application Laid-Open No. 2007-184912 discusses, for example, a technique that, when an auto-focus operation is performed in a state of the live view mode, a camera displays an object image in the optical finder by automatically switching the movable mirror, and also displays information set to a camera in the display unit.

However, the technique discussed in Japanese Patent Application Laid-Open No. 2007-184912 has an issue described below if an aspect ratio of an image captured by an image sensor and that of an image are different or the aspect ratio of a display unit that displays a live view and that of an image are different. When information set to a camera is displayed by automatically switching the movable mirror in a state of the live view mode, no object image will be displayed on the display unit, causing an issue that it becomes more difficult to frame an object image to be captured.

SUMMARY OF THE INVENTION

The present invention is directed to an imaging apparatus and an imaging method thereof capable of facilitating framing of an object to be captured when an image captured by an imaging unit is not displayed on a display unit.

According to an aspect of the present invention, an imaging apparatus includes an imaging unit, a setting unit configured to set an aspect ratio of an image to be captured by the imaging unit, and a display control unit configured to control a first mode that causes a display unit to display image data captured by the imaging unit by showing a shooting area in the aspect ratio and a second mode that does not cause the display unit to display the image data captured by the imaging unit, wherein the display control unit causes the display unit to display in the second mode information indicating the shooting area in the aspect ratio set by the setting unit and information from which at least one of a focus detectable position and a metering area within the shooting area in the aspect ratio is identifiable.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
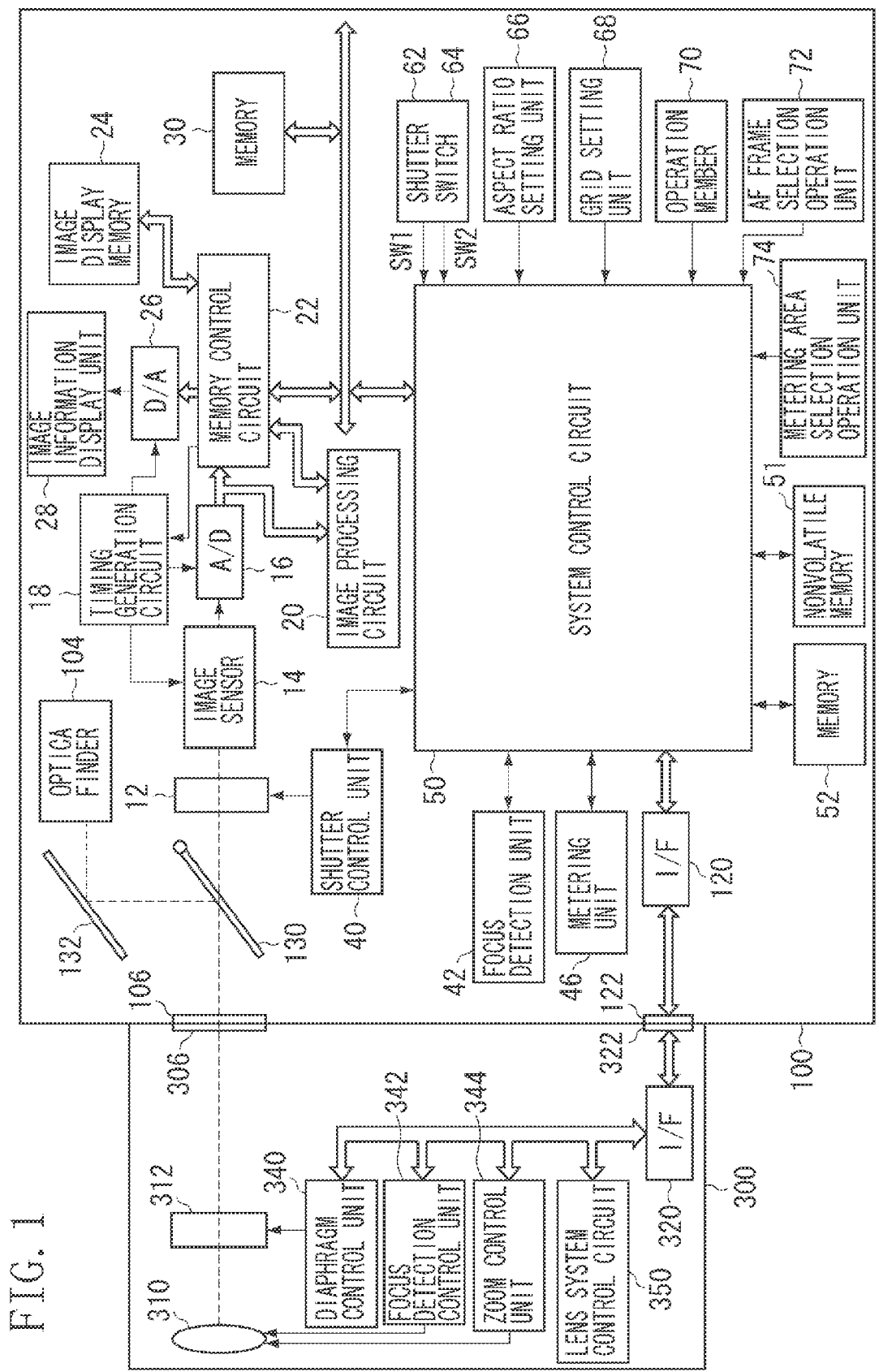
FIG. 1 is a block diagram illustrating an overall configuration of an imaging apparatus according to an exemplary embodiment of the present invention.

FIG. 1 is a block diagram illustrating an overall configuration of an imaging apparatus according to an exemplary embodiment of the present invention.

FIG. 1 illustrates an imaging apparatus 100. The imaging apparatus 100 includes a shutter 12 for controlling a light exposure to an image sensor 14. The image sensor 14 converts an optical image into an electric signal. A light beam incident on a lens 310 is guided by a single-lens reflex system via a diaphragm 312, lens mounts 306 and 106, a mirror 130, and the shutter 12 to form an optical image on the image sensor 14.

An A/D converter 16 converts an analog signal output from the image sensor 14 into a digital signal. A timing generation circuit 18 supplies a clock signal or a control signal to the image sensor 14, the A/D converter 16, and a D/A converter 26, and is controlled by a memory control circuit 22 and a system control circuit 50.

An image processing circuit 20 performs predetermined pixel interpolation processing or color conversion processing on data output from the A/D converter 16 or data from the memory control circuit 22. Moreover, the image processing circuit 20 performs, if necessary, predetermined arithmetic processing using captured image data and performs, based on an obtained operation result, predetermined arithmetic processing using image data captured by the system control circuit 50. Then, the image processing circuit 20 also performs, based on an obtained operation result, auto white balance (AWB) processing by a through the lens (TTL) method.

A memory control circuit 22 controls the A/D converter 16, the timing generation circuit 18, the image processing circuit 20, an image display memory 24, and the D/A converter 26. Output data from the A/D converter 16 is written into the image display memory 24 via the image processing circuit 20 and the memory control circuit 22 or directly via the memory control circuit 22.

The imaging apparatus 100 also includes the image display memory 24 and the D/A converter 26. An image information display unit 28 includes TFT, liquid crystal display (LCD), or the like, and image data for display written into the image display memory 24 is displayed by the image information display unit 28 via the D/A converter 26.

By sequentially displaying captured image data using the image information display unit 28, an electronic finder or live view function can be realized. Moreover, the image information display unit 28 can arbitrarily turn on/off the display through instructions of the system control circuit 50, and can significantly reduce power consumption of the imaging apparatus 100 when the display is turned off.

The image information display unit 28 displays a menu of the aspect ratio, grid display, and the like, or information about an image being displayed, through operations of an operation member 70.

A shutter control unit 40 controls the shutter 12 based on metering information from a metering unit 46 in cooperation with a diaphragm control unit 340 that controls the diaphragm 312. A focus detection unit 42 performs AF processing.

A light beam incident on the lens 310 is made to be incident on the focus detection unit 42 by the single-lens reflex system via the diaphragm 312, the lens mounts 306 and 106, the mirror 130, and a sub-mirror for focus detection (not illustrated). Accordingly, the focus detection unit 42 can measure a focus state of an image formed as an optical image (hereinafter, measurement processing of the focus state will be called phase-difference AF). Since no light beam is incident on the image sensor 14 in this case, image data of an object is not displayed on the image information display unit 28.

The metering unit 46 performs auto exposure (AE) processing. A light beam incident on the lens 310 is made to be incident on the metering unit 46 by the single-lens reflex system via the diaphragm 312, the lens mounts 306 and 106, the mirror 130, a mirror 132, and a metering lens (not illustrated). Accordingly, the metering unit 46 measures an exposure state of an image formed as an optical image. Since no light beam is incident on the image sensor 14 also in this case, image data of an object is not displayed on the image information display unit 28.

The system control circuit 50 controls the whole imaging apparatus 100, and controls each unit of the imaging apparatus 100 by executing various programs. A nonvolatile memory 51 is a recording medium for recording a program to be executed by the system control circuit 50 or a captured image.

The nonvolatile memory 51 may be a memory contained in the imaging apparatus 100 or a removable recording medium such as a memory card. A memory 52 is a memory that stores constants, variables, and programs for operation of the system control circuit 50, and is used as a work memory of the system control circuit 50.

Operation units 62, 64, 66, 68, 70, 72, and 74 are configured to input various operation instructions of the system control circuit 50, and are configured in a combination of a single or a plurality of a switch, dial, touch panel, pointing by line-of-sight detection, and voice recognition device.

The details of the operation units will be described. A shutter switch SW(1) 62 is turned on halfway through the operation of a shutter button (not illustrated). The shutter switch SW(1) 62 issues instructions to start operation of AF processing, automatic exposure (AE) processing, AWB processing, and electronic flash (EF) processing (light amount control).

A shutter switch SW(2) 64 is turned on with the full operation of the shutter button (not illustrated). The shutter switch SW(2) 64 issues instructions to start operation of a sequence of processing including exposure processing of writing a signal read from the image sensor 14 into a memory 30 via the A/D converter 16 and the memory control circuit 22 as image data, and development processing using operations by the image processing circuit 20 and the memory control circuit 22.

Figure 2A:
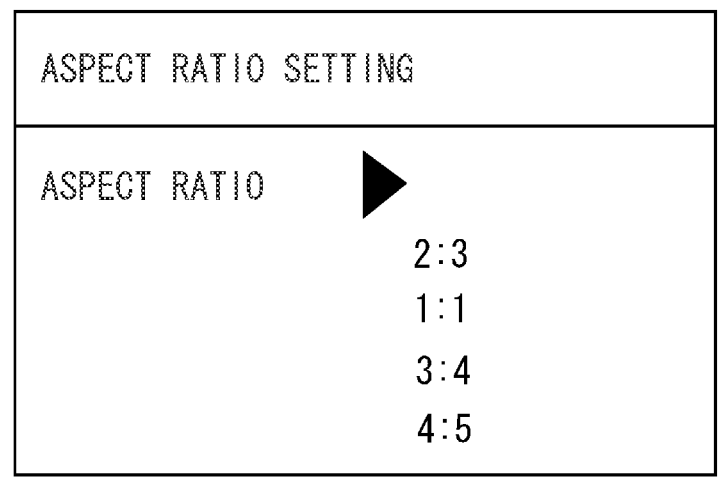
FIGS. 2A and 2B illustrates an example of setting screens for an aspect ratio and a grid display.

An aspect ratio setting unit 66 can set the aspect ratio of an image to be captured. By notifying the system control circuit 50 of content set therein, images can be captured in the set aspect ratio. A screen example to set the aspect ratio displayed on the image information display unit 28 looks like one illustrated in FIG. 2A, and the set value thereof can be selected through the operation member 70.

A grid setting unit 68 displays whether to make a grid display in the image information display unit 28. When a grid display should be made, what kind of grid display to make can be set. After the system control circuit 50 being notified of content set therein, the set grid content is displayed on the image information display unit 28 together with images.

Figure 2B:
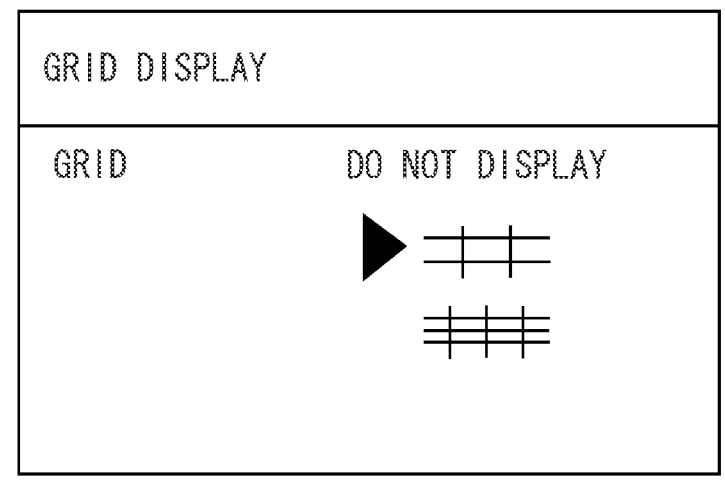

A screen example to set the grid display displayed on the image information display unit 28 looks like one illustrated in FIG. 2B, and the set value thereof may be selected via the operation member 70. The aspect ratio setting unit 66 and the grid setting unit 68 are components to be application examples of setting units according to the exemplary embodiment of the present invention.

The operation member 70 includes various buttons, the touch panel, and the like. More specifically the operation member 70 includes a menu button, set button, menu moving+ (plus) button, menu moving− (minus) button, reproduction image moving+ (plus) button, and reproduction image moving− (minus) button.

Further, the operation member 70 includes an image display ON/OFF switch to set ON/OFF of the image information display unit 28. Each function or numeric value of the above plus buttons and minus buttons can be selected lightly by being equipped with a rotary dial switch, cross switch, or 8-direction switch.

An AF frame selection operation unit 72 can set the position where the focus is detected in the image information display unit 28. By notifying the system control circuit 50 of content set therein, the focus state of an image formed as an optical image at the set position can be measured.

The set focus detection position can also be displayed on the image information display unit 28. A metering area selection operation unit 74 can set a position to be metered in the image information display unit 28. By notifying the system control circuit 50 of content set therein, the exposure state of an image formed as an optical image at the set position can be measured. Moreover, the set metering area (metering range) can be displayed on the image information display unit 28.

Figure 3:
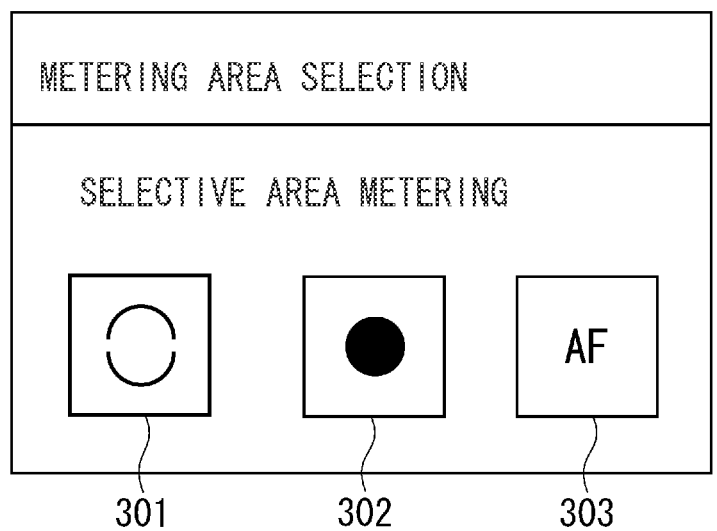
FIG. 3 illustrates an example of setting screen for a metering area.

FIG. 3 illustrates a display example for setting the metering area displayed on the image information display unit 28, and the set value can be selected via the operation member 70. The metering area includes selective area metering that meters an image center portion 401 in a wide range (FIG. 4A), spot metering that meters an image center portion vicinity 402 (FIG. 4B), and AF linked metering that meters an AF position vicinity 403 (FIG. 4C).

Figure 4A:
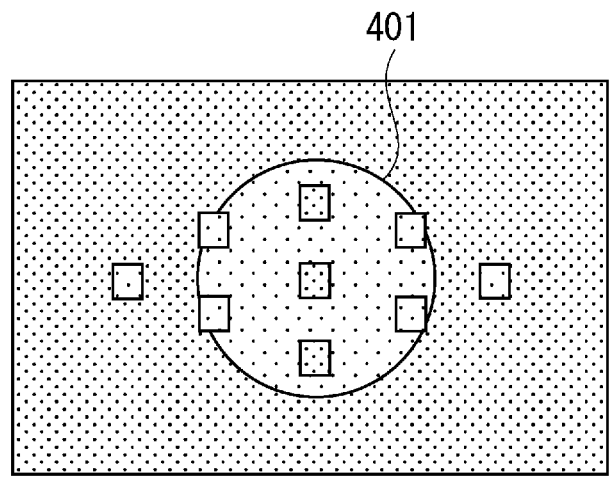
FIGS. 4A to 4C illustrates an area of selective area metering, an area of spot metering, and an area of auto focus (AF) linked metering.
Figure 4B:
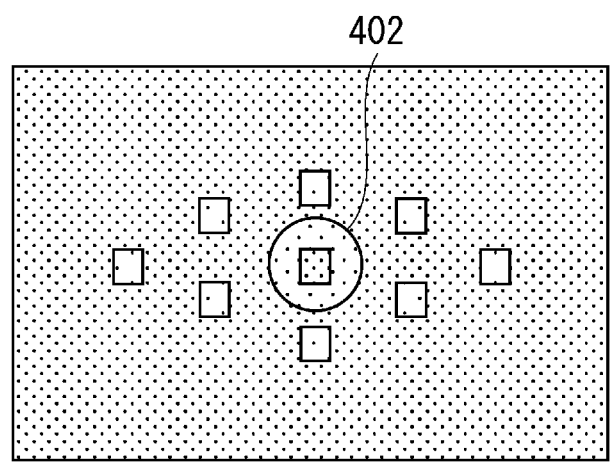
Figure 4C:
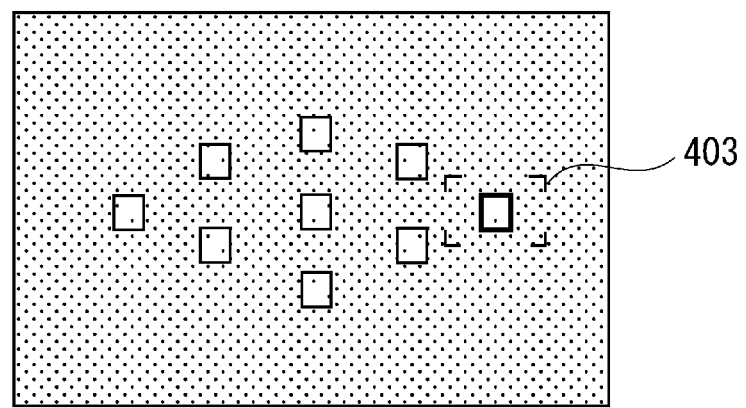

That is, if button 301 in FIG. 3 is selected, an area of selective area metering illustrated in FIG. 4A is selected. If button 302 in FIG. 3 is selected, an area of spot metering illustrated in FIG. 4B is selected. If button 303 in FIG. 3 is selected, an area of AF linked metering illustrated in FIG. 4C is selected.

An optical finder 104 guides a light beam incident on the lens 310 by the single-lens reflex system via the diaphragm 312, the lens mounts 306 and 106, and the mirrors 130 and 132 to form and display an image as an optical image. Accordingly, imaging can be done using only the optical finder 104 without using an electronic finder function of the image information display unit 28.

An interface 120 connects the imaging apparatus 100 to a lens unit 300 inside the lens mount 106. A connector 122 electrically connects the imaging apparatus 100 to the lens unit 300. The connector 122 not only exchanges control signals, status signals, and data signals between the imaging apparatus 100 and the lens unit 300, but also has a function to supply currents of various voltages. The connector 122 may be configured to perform, in addition to electrical communication, optical communication, voice communication, or the like.

The mirrors 130 and 132 can guide a light beam incident on the lens 310 to the optical finder 104 by the single-lens reflex system. Incidentally, the mirror 132 may be configured as a quick return mirror or a half mirror.

The lens unit 300 is of the interchangeable lens type. The lens mount 306 mechanically couples the lens unit 300 to the imaging apparatus 100. The lens mount 306 contains various functions to electrically connect the lens unit 300 to the imaging apparatus 100.

The lens unit 300 also includes the shooting lens 310 and the diaphragm 312. An interface 320 connects the lens unit 300 to the imaging apparatus 100 inside the lens mount 306. A connector 322 electrically connects the imaging apparatus 100 to the lens unit 300. The connector 322 not only exchanges control signals, status signals, and data signals between the imaging apparatus 100 and the lens unit 300, but also has a function of being supplied with currents of various voltages or to supply such currents. The connector 322 may be configured to perform, in addition to electrical communication, optical communication, voice communication, or the like.

A diaphragm control unit 340 controls the diaphragm 312 based on metering information from the metering unit 46 in cooperation with the shutter control unit 40 that controls the shutter 12. A focus detection control unit 342 controls focusing of the shooting lens 310. A zoom control unit 344 controls zooming of the shooting lens 310. A lens system control circuit 350 controls the whole lens unit 300.

The lens system control circuit 350 includes a memory that stores constants, variables, and programs for operation. The lens system control circuit 350 also includes a function of a nonvolatile memory holding identification information such as a number specific to the lens unit 300, management information, function information such as a full-aperture F number, minimum F number, and focal length, and present and past set values.

Figure 5:
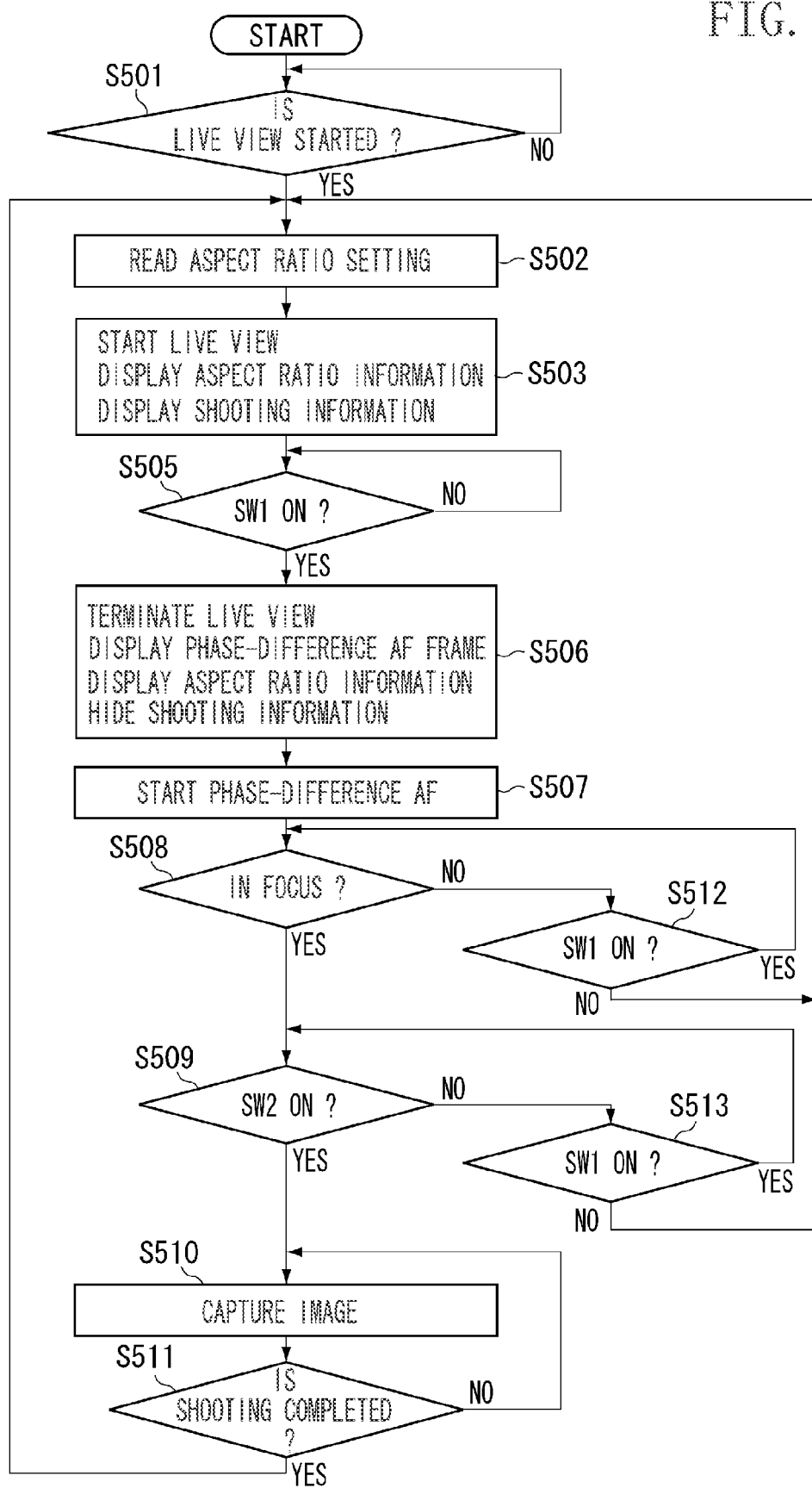
FIG. 5 is a flow chart illustrating processing to display the aspect ratio and a frame, which is a focus detection position for phase-difference AF according to the exemplary embodiment of the present invention.

FIG. 5 is a flow chart illustrating processing to display aspect ratio information and a frame (phase-difference AF frame), which is a focus detection position for phase-difference AF, on the image information display unit 28 when a transition from the live view mode to a mode that causes the optical finder 104 to display an object image occurs. With a program recorded in the nonvolatile memory 51 being expanded into the memory 52 for execution by the system control circuit 50, processing illustrated in this flow chart is realized.

The aspect ratio information is a rectangle of the set aspect ratio drawn on the image information display unit 28 described below. The live view mode is an application example of a first mode of the present exemplary embodiment, and the mode that causes the optical finder 104 to display an object image is an application example of a second mode of the present exemplary embodiment.

In step S501, the system control circuit 50 determines whether the live view is already started. If the live view is not started (No in step S501), the system control circuit 50 waits until the live view starts. The live view is started by a live view button, mode switching dial, or the like included in the operation member 70 being operated.

If, on the other hand, the live view is started (Yes in step S501), in step S502, the system control circuit 50 reads information from the memory 52 to see how the aspect ratio is set.

In step S503, the system control circuit 50 starts the live view by displaying an image captured by the image sensor 14 on the image information display unit 28, and also displays setting information of the aspect ratio read in step S502. The aspect ratio is a ratio of length and width of an image to be captured, is set by the aspect ratio setting unit 66, and includes 1:1, 3:4, 4:5, 6:7, 5:6, 5:7, 9:16, and 2:3.

The system control circuit 50 draws a rectangle (aspect ratio information) of the set aspect ratio. The system control circuit 50 also displays shooting information including the shutter speed, aperture value, exposure correction value, ON/OFF of light amount control correction, ISO value, number of shootable images, battery capacity, white balance, image processing state (such as contrast and sharpness), image size, drive mode (such as single shooting and continuous shooting), AF mode (such as phase-difference AF and video AF), AE lock, ON/OFF of AE bracket, ON/OFF of FE bracket, and histogram of a live view image.

Figure 6:
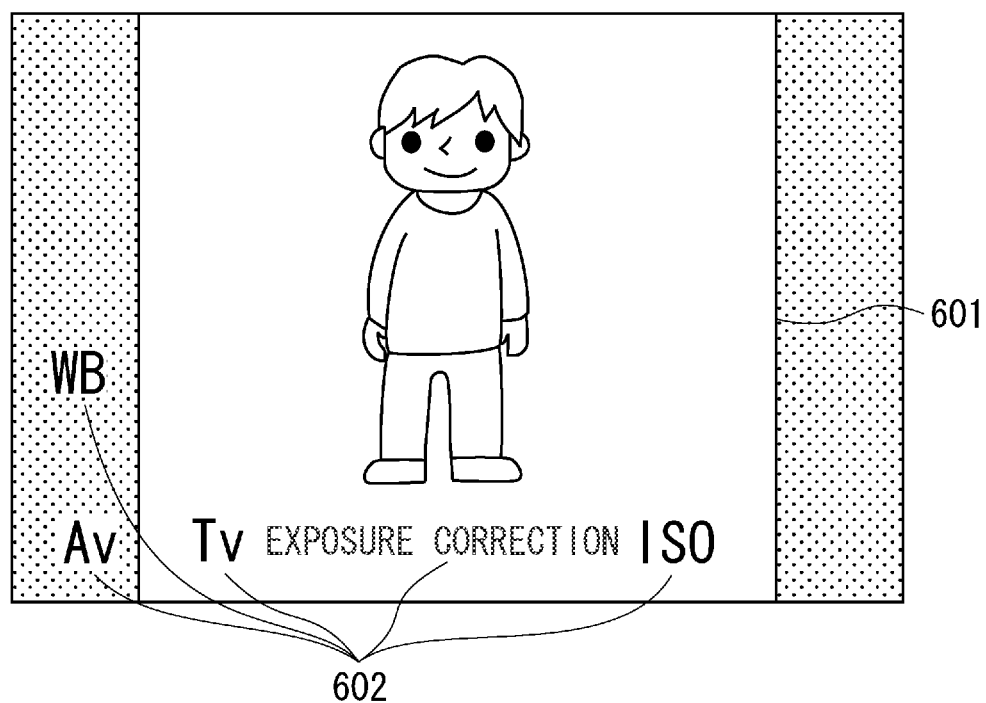
FIG. 6 illustrates a state in which shooting information is displayed.

FIG. 6 illustrates a state in which shooting information is displayed on the image information display unit 28. While an example, in which a portion of shooting information 602 is displayed together with aspect ratio information 601, is illustrated in FIG. 6, all shooting information may be displayed or several pieces or one piece of any shooting information may be displayed. Such information display may be set as the display/non-display mode according to user settings.

In step S505, the system control circuit 50 determines whether the shutter switch SW(1) 62 is ON. If the shutter switch SW(1) 62 is not ON (No in step S505), the system control circuit 50 waits until the shutter switch SW(1) 62 is turned on. When the shutter switch SW(1) 62 is turned on (Yes in step S505), in step S506, the system control circuit 50 moves up the mirror 130 for AF processing and AE processing, and terminates the live view display.

Then, the system control circuit 50 displays a phase-difference AF frame in the image information display unit 28 while no captured image is displayed, and displays aspect ratio information corresponding to the aspect ratio set by the aspect ratio setting unit 66. Accordingly, the position of the phase-difference AF frame in the shooting area represented by the aspect ratio information becomes identifiable.

At this point, the system control circuit 50 hides shooting information unrelated to the shooting area other than the phase-difference AF frame and aspect ratio information and the composition. The shooting information unrelated to the shooting area and the composition includes, for example, information on the shutter speed, aperture value, exposure correction value, ON/OFF of light amount control correction, ISO value, number of shootable images, battery capacity, white balance, image processing state (such as contrast and sharpness), image size, drive mode (such as single shooting and continuous shooting), AF mode (such as phase-difference AF and video AF), AE lock, ON/OFF of AE bracket, ON/OFF of FE bracket, and histogram of a live view image.

Figure 7:
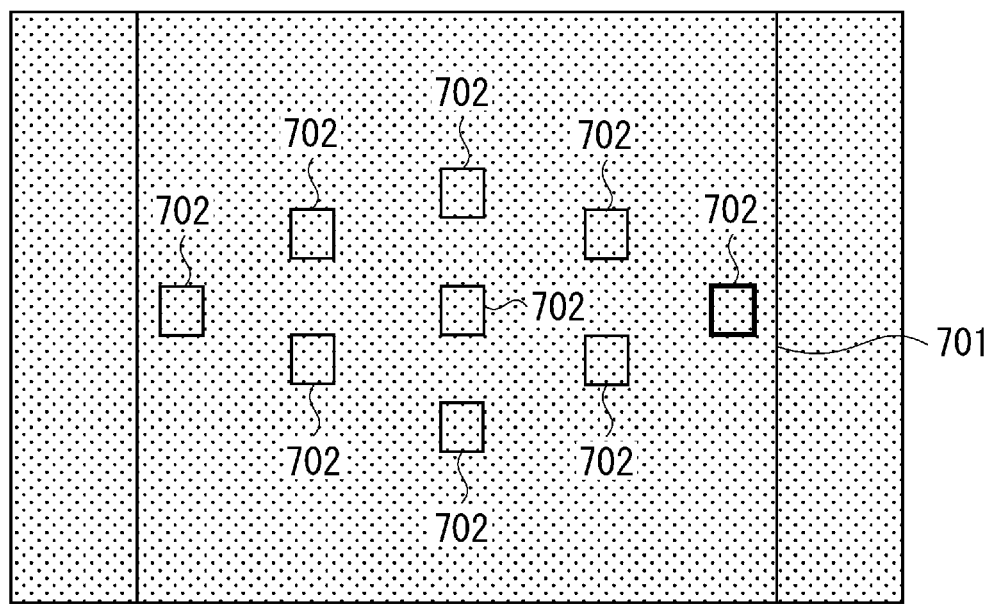
FIG. 7 illustrates an example in which nine phase-difference AF frames are displayed together with the aspect ratio.

As illustrated in FIG. 7, nine phase-difference AF frames are displayed on the image information display unit 28 at this point together with aspect ratio information 701. While the aspect ratio information 701 is displayed here as a frame, any display that makes the shooting area in the set aspect ratio identifiable may be used and, for example, a shade difference between inside and outside of the shooting area may be used.

If, at this point, the grid display is set by the grid setting unit 68, grid lines according to the set grid content may be displayed. Step S506 is a processing example of the display control unit according to the exemplary embodiment of the present invention.

In step S507, the system control circuit 50 causes a light beam incident on the lens 310 to be incident on the focus detection unit 42 by the single-lens reflex system via the diaphragm 312, the lens mounts 306 and 106, the mirror 130, and the sub-mirror for focus detection (not illustrated). Accordingly, the system control circuit 50 starts the phase-difference AF that measures the focus state of an image formed as an optical image.

The system control circuit 50 also causes a light beam incident on the lens 310 to be incident on the focus metering unit 46 by the single-lens reflex system via the diaphragm 312, the lens mounts 306 and 106, the mirrors 130 and 132, and a metering lens (not illustrated). Accordingly, the system control circuit 50 issues instructions to start operation of AE processing of measuring the exposure state of an image formed as an optical image, EF processing, or the like.

In step S508, the system control circuit 50 determines whether an image is focused in auto-focus processing. If the image is not in focus (No in step S508), the processing proceeds to step S512 and if the image is in focus (Yes in step S508), the processing proceeds to step S509 after the in-focused position by the phase-difference AF is displayed in red.

In step S509, the system control circuit 50 determines whether the shutter switch SW(2) 64 is ON. If the shutter switch SW(2) 64 is not ON (No in step S509), the processing proceeds to step S513, and if the shutter switch SW(2) 64 is ON (Yes in step S509), the processing proceeds to step S510. When the shutter switch SW(2) 64 is turned on, in step S510, the system control circuit 50 writes a signal read from the image sensor 14 into the memory 30 via the A/D converter 16 and the memory control circuit 22 as image data.

In step S511, the system control circuit 50 determines whether image capturing is completed and shooting is completed. If shooting is not completed (No in step S511), the system control circuit 50 continues image capturing in step S510 and if shooting is completed (Yes in step S511), the processing returns to step S502 for the next shooting.

In step S512, the system control circuit 50 determines whether ON of the shutter switch SW(1) 62 continues. If ON of the shutter switch SW(1) 62 continues (Yes in step S512), the processing returns to step S508, and if ON of the shutter switch SW(1) 62 does not continue (No in step S512), the processing returns to step S502.

In step S513, the system control circuit 50 determines whether ON of the shutter switch SW(1) 62 continues. If ON of the shutter switch SW(1) 62 continues (Yes in step S513), the processing returns to step S509, and if ON of the shutter switch SW(1) 62 does not continue (No in step S513), the processing returns to step S502.

Thus, a transition from the live view mode to a mode that causes the optical finder 104 to display an object image occurs and when a state in which no image captured by the image sensor 14 is displayed on the image information display unit 28 is brought about, the phase-difference AF frame and aspect ratio information are displayed. Accordingly, which area in the shooting area in the aspect ratio to be shot by a user is in focus can be known, thus making framing easier.

If, in step S503, the system control circuit 50 makes a grid display set by a grid 63, in step S506, it becomes still easier to know which area of the phase-difference AF frame in the shooting area is in-focus. Accordingly, even if no image captured by the image sensor 14 is displayed on the image information display unit 28, shooting without failure can be performed.

In step S506 described above, the system control circuit 50 displays, after the live view display is terminated, the phase-difference AF frame and aspect ratio information set by the aspect ratio setting unit 66 on the image information display unit 28 and hides shooting information unrelated to the shooting area and the composition.

In addition, however, a metering area, which is the position where AE is performed, may be displayed. In this case, in step S506, the system control circuit 50 displays the phase-difference AF frame, metering area, and aspect ratio information, and hides shooting information unrelated to the shooting area and the composition other than the phase-difference AF frame, metering area, and aspect ratio information.

Figure 8:
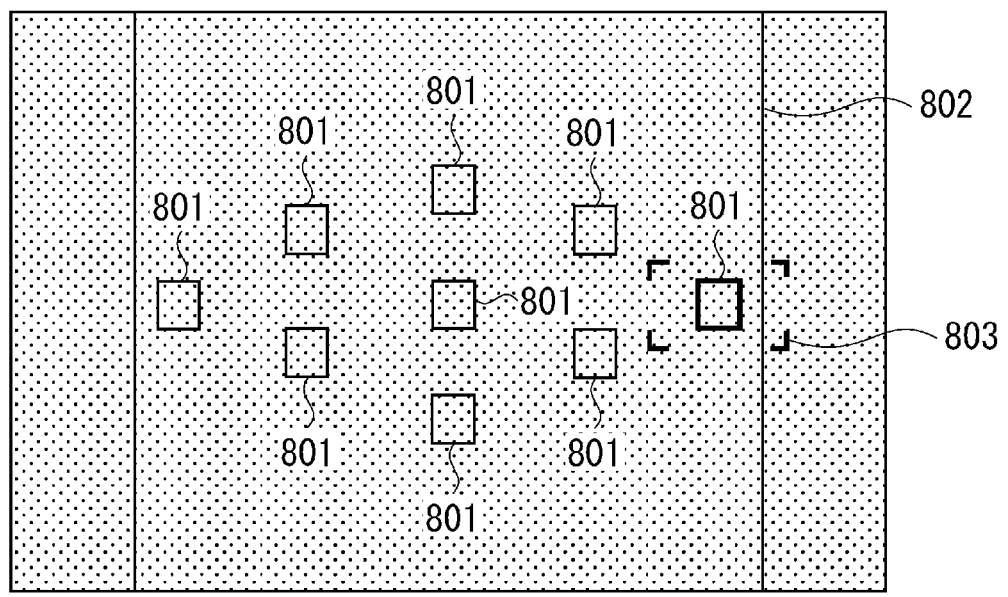
FIG. 8 illustrates an example in which nine phase-difference AF frames and one metering area are displayed together with aspect ratio information.

More specifically, as illustrated in FIG. 8, nine phase-difference AF frames 801 and one metering area 803 are displayed together with the aspect ratio information 802 on the image information display unit 28. If the grid display is set by the grid setting unit 68, grid lines according to the set grid content may be displayed.

Then, in step S507, the system control circuit 50 starts, in addition to the phase-difference AF, AE processing and EF processing. More specifically, the system control circuit 50 causes a light beam incident on the lens 310 to be incident on the focus metering unit 46 by the single-lens reflex system via the diaphragm 312, the lens mounts 306 and 106, the mirrors 130 and 132, and a metering lens (not illustrated).

Accordingly, the system control circuit 50 issues instructions to start operation of AE processing of measuring the exposure state of an image formed as an optical image, EF processing, or the like. The metering area is determined by which portion of an image formed as an optical image is incident on the metering unit 46, and includes selective area metering that meters an image center portion in a wide range, spot metering that meters an image center portion vicinity, and AF linked metering that meters an AF position vicinity.

Accordingly, by displaying the phase-difference AF frame, metering area, and aspect ratio information when no image captured by the image sensor 14 is displayed, the user can know which area in the shooting area in the set aspect ratio is in-focus and metering is performed, thus making framing easier.

Instead of displaying the phase-difference AF frame in step S506 described above, a metering area may be displayed. That is, after terminating the live view display in step S506 described above, the metering area and the aspect ratio information set by the aspect ratio setting unit 66 may be displayed while shooting information unrelated to the shooting area and the composition are hidden.

Figure 9:
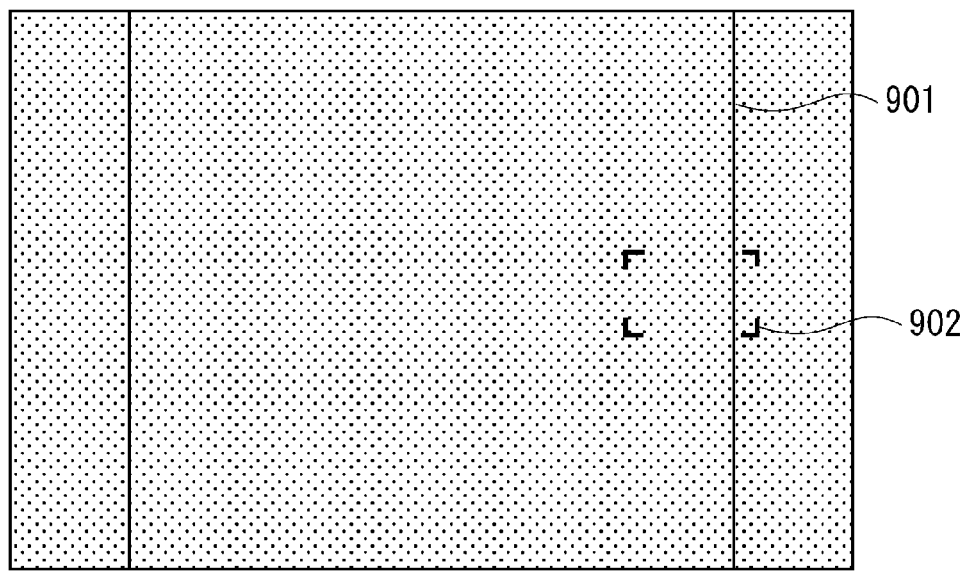
FIG. 9 illustrates an example in which one phase-difference AF frame is displayed together with aspect ratio information.

As illustrated in FIG. 9, a metering area 902 is displayed on the image information display unit 28, in this case, together with aspect ratio information 901. If the grid display is set by the grid setting unit 68, grid lines according to the set grid content may be displayed.

Then, in step S507, the system control circuit 50 starts, in addition to the phase-difference AF, AE processing and EF processing. More specifically, the system control circuit 50 causes a light beam incident on the lens 310 to be incident on the focus metering unit 46 by the single-lens reflex system via the diaphragm 312, the lens mounts 306 and 106, the mirrors 130 and 132, and the metering lens (not illustrated).

Accordingly, the system control circuit 50 issues instructions to start operation of AE processing of measuring the exposure state of an image formed as an optical image, EF processing, or the like. Accordingly, by displaying the metering area and aspect ratio information when the phase-difference AF frame is selected, which area in the shooting area in the set aspect ratio is metered becomes easily recognizable, making the setting of the phase-difference AF frame easier.

Next, a second exemplary embodiment of the present invention will be described. In the present exemplary embodiment, when a transition from the live view mode to a mode that causes the optical finder to display an object image occurs, whether to display the phase-difference AF frame, metering area, and the like can be selected.

Figure 10:
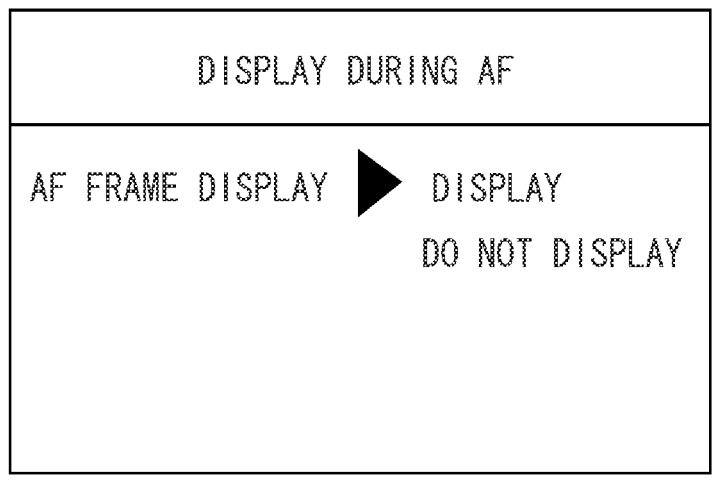
FIG. 10 illustrates a display example of an image information display unit according to a second exemplary embodiment of the present invention.

FIG. 10 is a diagram illustrating a display example of the image information display unit 28 in the second exemplary embodiment of the present invention.

In the present exemplary embodiment, after a transition to a mode that causes the optical finder to display an object image, an operation screen in FIG. 10 is provided as an operation unit for selecting which of the phase-difference AF frame, metering area, and the like the image information display unit 28 is caused to display when no image captured by the image sensor 14 is displayed on the image information display unit 28.

With the operation screen in FIG. 10 being operated by the user, which information is displayed on the image information display unit 28 can be selected, when no image captured by the image sensor 14 is displayed during AF, thus making settings of the phase-difference AF frame, metering area, and the like easier.

Next, a third exemplary embodiment of the present invention will be described. An operation to display the phase-difference AF frame and the aspect ratio information during AF in the third exemplary embodiment of the present invention will be described below.

For the selection of the phase-difference AF frame by the AF frame selection operation unit 72, an image captured by the image sensor 14 may be displayed or not be displayed depending on whether a live view is being performed when the AF frame selection operation unit 72 is operated.

Figure 11A:
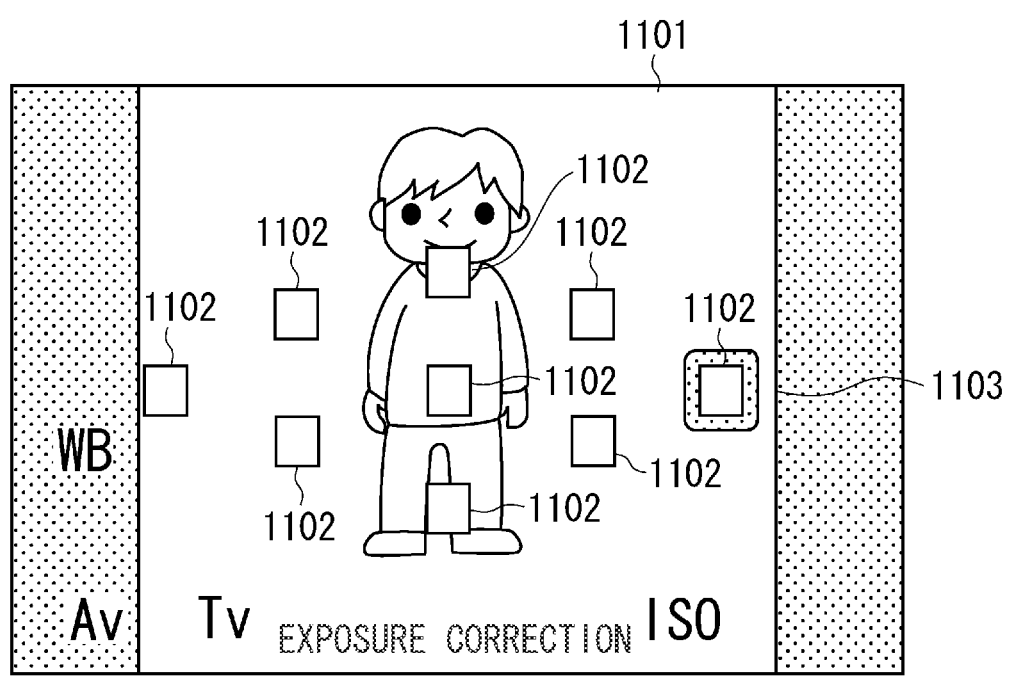
FIGS. 11A and 11B illustrate screen examples for selecting the phase-difference AF frame when a live view is performed and when no live view is performed.

FIG. 11A illustrates a screen example in which the AF frame selection operation unit 72 is operated to select the phase-difference AF frame when a live view is being performed.

In FIG. 11A, a live view is being performed based on user instructions through an operation of the above live view button or mode switching dial in the shooting mode and thus, an image captured by the image sensor 14 is displayed on the image information display unit 28. The system control circuit 50 displays an image 1101 captured by the image sensor 14 on the image information display unit 28 and phase-difference AF frames 1102 at focus detectable positions on the image.

The focus detection position used for shooting can be selected by the user, and which phase-difference AF frame is selected can be recognized by changing the color, line thickness, or the like thereof. Further, the system control circuit 50 displays aspect ratio information 1103 set by the aspect ratio setting unit 66 on the image information display unit 28.

Figure 11B:
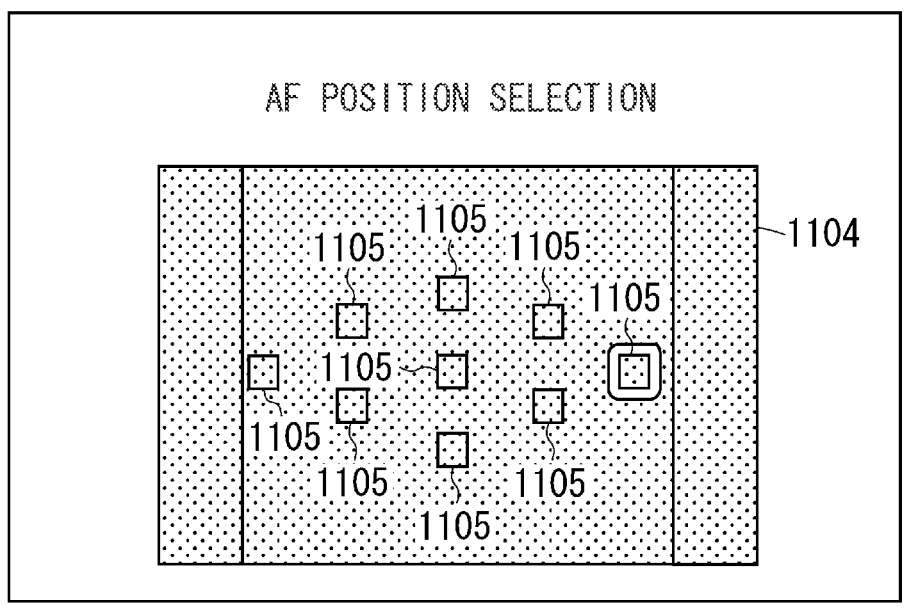

FIG. 11B illustrates a screen example in which the AF frame selection operation unit 72 is operated to select the phase-difference AF frame when a live view is not being performed. An object image is guided to the optical finder 104 by moving up the mirror 130 when no instruction to perform a live view is received from the user via the above-described live view button or mode switching dial in shooting mode.

Thus, the object image is not guided to the image sensor 14, and the image captured by the image sensor 14 is not displayed. Also in this case, the system control circuit 50 draws a rectangle (aspect ratio information) 1104 of the aspect ratio set by the aspect ratio setting unit 66 on the image information display unit 28, and displays phase-difference AF frames 1105 at focus detectable positions in the rectangle.

The focus detection position used when shooting can be selected by the user, and which phase-difference AF frame is selected can be recognized by changing the color, line thickness, or the like thereof. Further, the system control circuit 50 displays aspect ratio information corresponding to the aspect ratio set by the aspect ratio setting unit 66.

Even if no image captured by the image sensor 14 is displayed when the focus detection position is selected as described above, a rectangle (aspect ratio information) of the same aspect ratio as that of the image information display unit 28 is displayed, and phase-difference AF frames selectable is displayed thereon. By displaying selectable phase-difference AF frames and aspect ratio information, focus detection positions within the shooting area in the aspect ratio set by the aspect ratio setting unit 66 become more easily recognizable.

The third exemplary embodiment has described the display of selectable phase-difference AF frames, but like the first exemplary embodiment, a metering area may be displayed in addition to phase-difference AF frames or a metering area may be displayed instead of phase-difference AF frames.

Next, a fourth exemplary embodiment of the present invention will be described. When the aspect ratio is set by the aspect ratio setting unit 66 as described above, instead of the display in FIG. 2A, aspect ratio information and at least one of the currently set phase-difference AF frame and metering area may be displayed simultaneously.

Figure 12A:
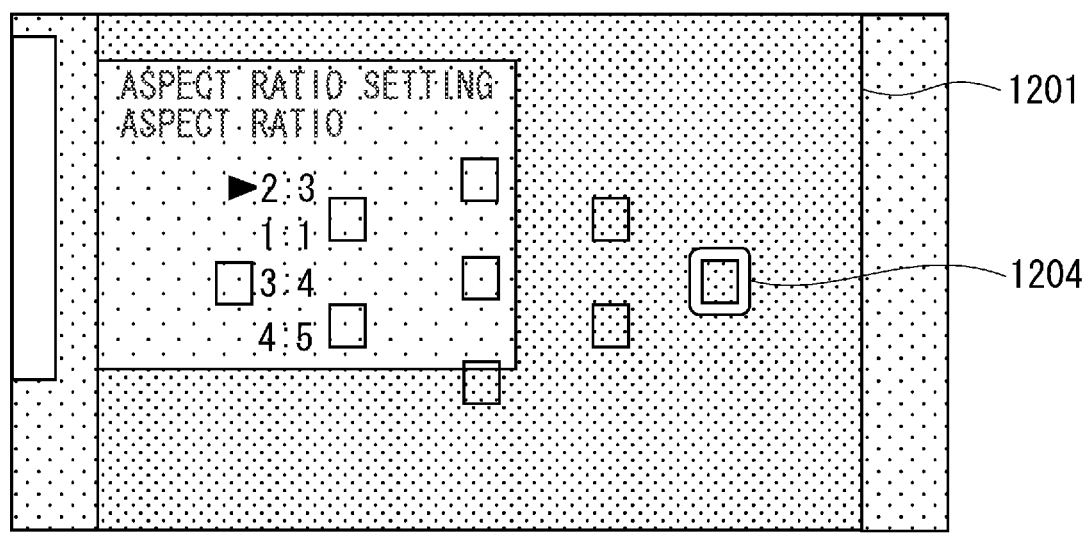
FIGS. 12A to 12C illustrate examples in which a rectangle of the set aspect ratio and the currently set phase-difference AF frame are simultaneously displayed.
Figure 12B:
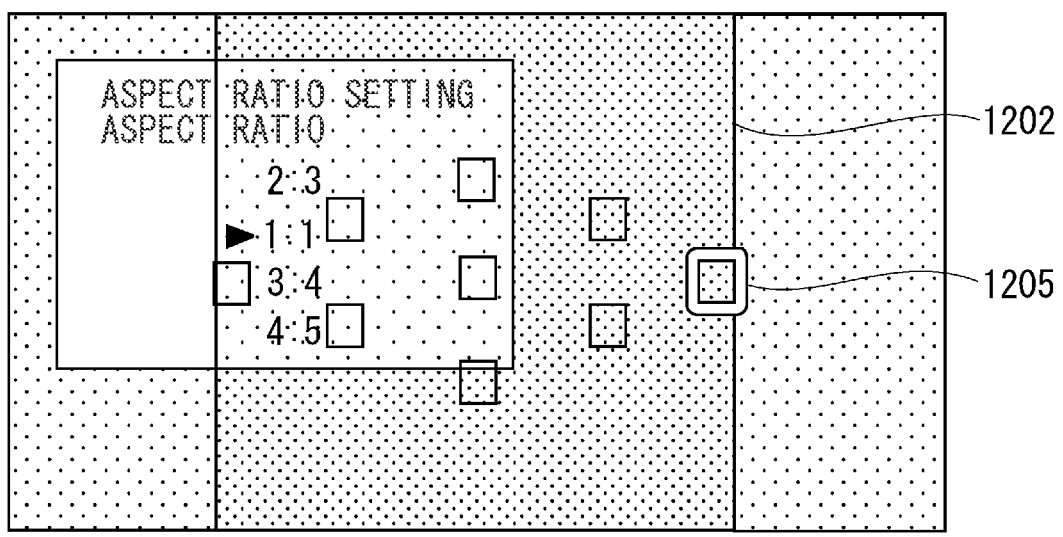
Figure 12C:
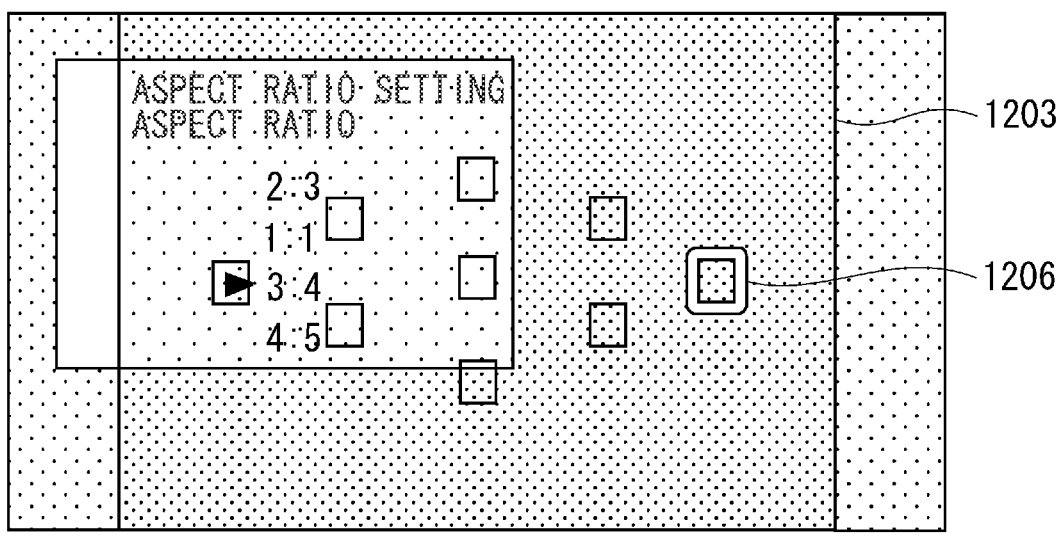

FIGS. 12A to 12C are aspect ratio setting screens, and illustrate examples that display rectangles 1201 to 1203 of the set aspect ratio and currently set phase-difference AF frames 1204 to 1206 simultaneously.

FIG. 12A illustrates a display example when the aspect ratio (length:width) of 2:3 is selected by an operation of the aspect ratio setting unit 66, and a rectangle of the aspect ratio of 2:3 is displayed.

FIG. 12B illustrates a display example when the aspect ratio (length:width) of 1:1 is selected by an operation of the aspect ratio setting unit 66, and a rectangle of the aspect ratio of 1:1 is displayed.

FIG. 12C illustrates a display example when the aspect ratio (length:width) of 3:4 is selected by an operation of the aspect ratio setting unit 66, and a rectangle of the aspect ratio of 3:4 is displayed.

If a determination button contained in the aspect ratio setting unit 66 is pressed on these screens, or these screens are passed through by an operation of the shutter switch SW(1) or the like, the aspect ratio is confirmed with the selected aspect ratio.

Thus, when a mode in which no image captured by the image sensor 14 is displayed on the image information display unit 28 is set, at least one of the currently set phase-difference AF frame and metering area is displayed simultaneously with a rectangle from which the aspect ratio to be set can be identified. Accordingly, if the aspect ratio is changed, the user can know which area within the shooting area in the changed aspect ratio is to be focus-detected or metered more easily, thus making shooting area (aspect ratio) settings easier.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-198354 filed Aug. 28, 2009, which is hereby incorporated by reference herein in its entirety.

What is claimed is:

1. An imaging apparatus comprising:
an imaging unit;
a setting unit configured to set an aspect ratio of an image to be captured by the imaging unit;
a display control unit configured to control a first mode in which a display unit displays image data captured by the imaging unit by indicating a shooting area in the aspect ratio, and a second mode in which the display unit does not display the image data captured by the imaging unit; and
a focus detection unit configured to detect a focus for phase-difference AF wherein the imaging apparatus is operated in the second mode in response that the focus detection unit detects the focus for phase-difference AF,
wherein the display control unit controls the display unit to display, in the second mode in response that the focus detection unit detects a focus for phase-difference AF, information indicating the shooting area in the aspect ratio set by the setting unit and information from which at least one of the focus detectable position and a metering area within the shooting area in the aspect ratio is identifiable to enable a user to identify the shooting area in the aspect ratio set by the setting unit and at least one of the focus detectable position, and the metering area within the shooting area in the aspect ratio after the focus detection unit detects a focus for phase-difference AF.

2. The imaging apparatus according to claim 1, wherein the display control unit displays the information indicating the shooting area in the aspect ratio set by the setting unit and grid lines on the display unit.

3. The imaging apparatus according to claim 1, wherein at least one of processing to measure a focus state of the image formed by the imaging unit and processing to measure an exposure state of the image formed by the imaging unit is performed in the second mode.

4. The imaging apparatus according to claim 1, wherein the display control unit hides information other than information indicating the shooting area in the aspect ratio and information indicating at least one of the focus detectable position and the metering area in the second mode.

5. The imaging apparatus according to claim 1, wherein the focus detectable position is a position where the focus detection unit detects a focus.

6. The imaging apparatus according to claim 5, further comprising:
an optical finder; and
a mirror movable between a first position where an object light is incident on the imaging unit and a second position where the object light is incident on the focus detection unit and the optical finder.

7. The imaging apparatus according to claim 6, further comprising:
a receiving unit configured to receive a photographing preparation instruction to start AF processing; and
a control unit configured to perform control to move the mirror from the first position to the second position in response to the photographing preparation instruction while the display control unit is displaying image data in the first mode,
wherein the display control unit changes a mode from the first mode to the second mode in accordance with the control unit having moved the mirror to the second position in response to the photographing preparation instruction.

8. The imaging apparatus according to claim 1, further comprising:
a selection unit configured to select a position used for detecting a focus during AF processing from the detectable positions.

9. The imaging apparatus according to claim 1, wherein the display control unit identifiably displays a position where an image is focused in AF processing out of the focus detectable positions.

10. The imaging apparatus according to claim 1, wherein the display control unit hides, in accordance with having changed a mode from the first mode to the second mode, at least one of information on the shutter speed, an aperture value, an exposure correction value, ON/OFF of light amount control correction, an ISO value, a number of shootable images, battery capacity, white balance, an image processing state, an image size, drive mode, an AF mode, AE lock, ON/OFF of AE bracket, ON/OFF of FE bracket, and histogram of a live view image which are displayed in the first mode.

11. The imaging apparatus according to claim 1, further comprising:
a metering unit configured to perform photometric processing for AE processing,
wherein the metering area is an area where the metering unit performs photometric processing.

12. The imaging apparatus according to claim 9, wherein the metering unit performs photometric processing without using the image captured by the imaging unit.

13. The imaging apparatus according to claim 1, further comprising:
a display setting unit configured to preset whether the display control unit displays the focus detectable position or not and/or whether the display control unit displays the metering area or not, in the second mode, according to a user's operation.

14. The imaging apparatus according to claim 8, wherein the display control unit performs control to display information indicating the shooting area in the aspect ratio set by the setting unit and information from which at least one of a focus detectable position and a metering area within the shooting area in the aspect ratio is identifiable in the second mode, when the selection unit selects a position used for detecting a focus.

15. The imaging apparatus according to claim 1, wherein the display control unit performs control to display information indicating the shooting area in an aspect ratio that is chosen and information from which at least one of a focus detectable position and a metering area within the shooting area in the aspect ratio is identifiable in the second mode on a screen for selecting one of a plurality of aspect ratios as an aspect ratio to be set by the setting unit.

16. An imaging method, comprising:
  setting an aspect ratio of an image captured by an imaging unit of an imaging apparatus;
  controlling a display unit to display, in a first mode, image data captured by the imaging unit by displaying a shooting area in the aspect ratio, and not to display, in a second mode, the image data captured by the imaging unit; and
  detecting, by a focus detection unit, a focus for phase-difference AF wherein the imaging apparatus is operated in the second mode in response that the detecting step detects the focus for phase-difference AF,
  controlling the display unit, in the second mode in response that the focus detection unit detects a focus for phase-difference AF, to display information indicating the shooting area in the set aspect ratio and information from which at least one of the focus detectable position and a metering area within the shooting area in the aspect ratio is identifiable to enable a user to identify the shooting area in the aspect ratio set by the setting step and at least one of the focus detectable position, and the metering area within the shooting area in the aspect ratio after the detecting step detects a focus for phase-difference AF.

17. A non-transitory computer readable recording medium that records a program causing a computer to execute a method, comprising:
  setting an aspect ratio of an image captured by an imaging unit of an imaging apparatus;
  controlling a display unit to display, in a first mode, image data captured by the imaging unit by displaying a shooting area in the aspect ratio, and not to display, in a second mode, the image data captured by the imaging unit; and
  detecting, by a focus detection unit, a focus for phase-difference AF wherein the imaging apparatus is operated in the second mode in response that the detecting step detects the focus for phase-difference AF,
  controlling the display unit, in the second mode in response that the focus detection unit detects a focus for phase-difference AF, to display information indicating the shooting area in the set aspect ratio and information from which at least one of the focus detectable position and a metering area within the shooting area in the aspect ratio is identifiable to enable a user to identify the shooting area in the aspect ratio set by the setting step and at least one of the focus detectable position, and the metering area within the shooting area in the aspect ratio after the detecting step detects a focus for phase-difference AF.

* * * * *